United States Patent
Tang

(10) Patent No.: US 11,510,159 B2
(45) Date of Patent: Nov. 22, 2022

(54) SIGNAL TRANSMISSION METHOD, NETWORK DEVICE, AND TERMINAL DEVICE

(71) Applicant: GUANGDONG OPPO MOBILE TELECOMMUNICATIONS CORP., LTD., Guangdong (CN)

(72) Inventor: Hai Tang, Guangdong (CN)

(73) Assignee: GUANGDONG OPPO MOBILE TELECOMMUNICATIONS CORP., LTD., Guangdong (CN)

(*) Notice: Subject to any disclaimer, the term of this patent is extended or adjusted under 35 U.S.C. 154(b) by 32 days.

(21) Appl. No.: 17/031,444

(22) Filed: Sep. 24, 2020

(65) Prior Publication Data

US 2021/0007069 A1    Jan. 7, 2021

Related U.S. Application Data

(63) Continuation of application No. PCT/CN2018/081188, filed on Mar. 29, 2018.

(51) Int. Cl.
*H04W 56/00* (2009.01)
*H04W 72/00* (2009.01)
*H04W 72/04* (2009.01)

(52) U.S. Cl.
CPC ....... *H04W 56/001* (2013.01); *H04W 72/005* (2013.01); *H04W 72/046* (2013.01); *H04W 72/0446* (2013.01); *H04W 72/0453* (2013.01)

(58) Field of Classification Search
CPC ........... H04W 8/08; H04W 4/10; H04W 8/20; H04W 8/26; H04W 48/18; H04W 84/08; H04W 84/16; H04W 92/02

(Continued)

(56) References Cited

U.S. PATENT DOCUMENTS

2014/0198772 A1   7/2014  Baldemair et al.
2014/0321375 A1  10/2014  Agiwal et al.
(Continued)

FOREIGN PATENT DOCUMENTS

CN   104769988 A   7/2015
CN   106797611 A   5/2017
(Continued)

OTHER PUBLICATIONS

3GPP TSG RAN WG1 Meeting #92—Athens, Greece, Feb. 26-Mar. 2, 2018—R1-1802526—Nokia, Nokia Shanghai Bell, Potential solutions and techniques for NR unlicensed (10 pages).

(Continued)

*Primary Examiner* — Nghi H Ly
(74) *Attorney, Agent, or Firm* — Perkins Coie LLP

(57) ABSTRACT

Implementations of the present disclosure provide a signal transmission method, a network device, and a terminal device. The method comprises: a network device detecting a first carrier, and determining, according to the detection result, a time-frequency resource granted a channel license from M1 time-frequency resources, wherein the M1 time-frequency resources are time-frequency resources that the network device configures for a first period on the first carrier and are available to transmit a first synchronization signal/PBCH block (SSB, or SS/PBCH block), wherein M1 is a positive integer, and M1≥2; and the network device transmitting the first SSB to a terminal device via the first time-frequency resource.

18 Claims, 3 Drawing Sheets

(58) Field of Classification Search
USPC .............. 370/329, 328, 338, 341, 345, 350
See application file for complete search history.

(56) References Cited

U.S. PATENT DOCUMENTS

| | | | |
|---|---|---|---|
| 2016/0157217 A1 | 6/2016 | Xue et al. | |
| 2017/0094624 A1 | 3/2017 | Balachandran et al. | |
| 2018/0227866 A1* | 8/2018 | Jung | H04L 5/0053 |
| 2021/0297961 A1 | 9/2021 | Park et al. | |

FOREIGN PATENT DOCUMENTS

| | | |
|---|---|---|
| CN | 107528682 A | 12/2017 |
| EP | 3577841 A1 | 12/2019 |
| KR | 20120064087 A | 6/2012 |
| KR | 101981151 B1 | 5/2019 |
| RU | 2480962 C2 | 4/2013 |
| RU | 2607470 C2 | 1/2017 |
| WO | 2018010505 A1 | 1/2018 |
| WO | 2018030774 A1 | 2/2018 |
| WO | 2018031290 A1 | 2/2018 |
| WO | 2018045307 A1 | 3/2018 |
| WO | 2018049274 A1 | 3/2018 |

OTHER PUBLICATIONS

EPO, Extended European Search Report for European Patent Application No. 18911748.4, dated Mar. 10, 2021. 10 pages.
IPA, Examination Report No. 1 for Australian Patent Application No. 2018415294, dated Apr. 21, 2021. 4 pages.
International Search Report dated Dec. 28, 2018 of PCT/CN2018/081188 (4 pages).
First Office Action and English Translation dated Dec. 4, 2020 cited in Russian Application No. 2020134394.
Examination Report for European Application No. 18911748.4 dated Nov. 16, 2021. 7 pages.
Examination Report for Indian Application No. 202027046654 dated Sep. 15, 2021. 7 pages with English translation.
Intel Corporation "SS block composition" R1-1707337; 3GPP TSF RAN WG1 Meeting #89; May 15-19, 2017. 8 pages.
InterDigital Inc. "Considerations on Synchronization Signal for NR Unlicensed Spectrum" R1-1802647; 3GPP TSG RAN WG1 Meeting 92; Feb. 26-Mar. 2, 2018. 4 pages.
ITL "On NR-SS structure and time indexing" R1-1705792; 3GPP TSF RAN WG1 Meeting #88bis; Apr. 3-7, 2017. 6 pages.
LG Electronics "Discussion on search space design" R1 -1715871; 3GPP TSF RAN WG1 Meeting NR#3. 11 pages.
Notice of Reasons for Refusal for Japanese Application No. 2020-551974 dated Oct. 15, 2021. 16 pages with English translation.
Notification of Reason for Refusal for Korean Application No. 10-2020-7028856 dated Sep. 24, 2021. 15 pages with English translation.
Samsung "Remaining details on QCL" R1-1720315; 3GPP TSG RAN WG1 #91; Nov. 27-Dec. 1, 2017. 12 pages.
Notice of Allowance of the Korean application No. 10-2020-7028856, dated Mar. 3, 2022. 4 pages with English Translation.
Examination report of the European application No. 18911748.4, dated Jun. 1, 2022. 7 pages.
First Office Action of the Chinese application No. 202011317491.4, dated Jun. 7, 2022. 14 pages with English Translation.
First Written Opinion of the Singaporean application No. 11202009459Q, dated Jul. 25, 2022. 8 pages.
Second Office Action of the Japanese application No. 2020-551974, dated Jun. 14, 2022. 7 pages with English Translation.
First Office Action for Taiwanese Application No. 108110650 dated Sep. 5, 2022. 37 pages with English translation.
Guangdong OPPO Mobile Telecom "Discussion on design of SS block" R1-1713240; 3GPP TSG RAN WG1 Meeting #90; Prague, Czech; Aug. 21-25, 2017. 2 pages.
Guangdong OPPO Mobile Telecom "Discussion on the timing indication of SS block" R1-1713291; 3GPP TSF RAN WG1 Meeting #90; Prague, Czech Republic; Aug. 21-25, 2017. 4 pages.
Second Office Action for Chinese Application No. 2020113174914 dated Sep. 5, 2022. 15 pages with English translation.

\* cited by examiner

300

A terminal device detects a first Synchronization signal/PBCH block (SSB, or SS/PBCH block) on M1 time-frequency resources on a first carrier to determine a first time-frequency resource that a network device sends the first SSB, wherein the M1 time-frequency resources are time-frequency resources, which are available for transmitting the first SSB, configured by the network device for a first period on the first carrier, M1 is a positive integer, and M1≥2 — S310

The terminal device receives, through the first time-frequency resource, the first SSB sent by the network device — S320

FIG. 3

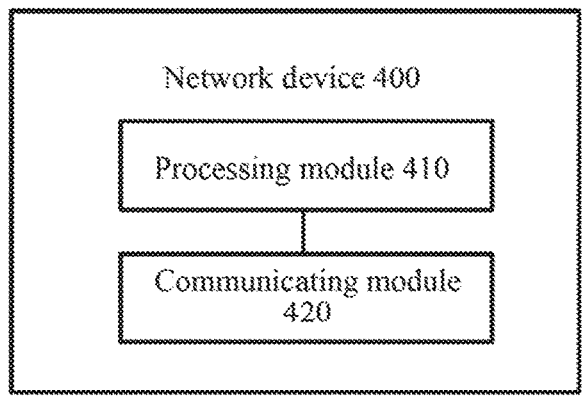

FIG. 4

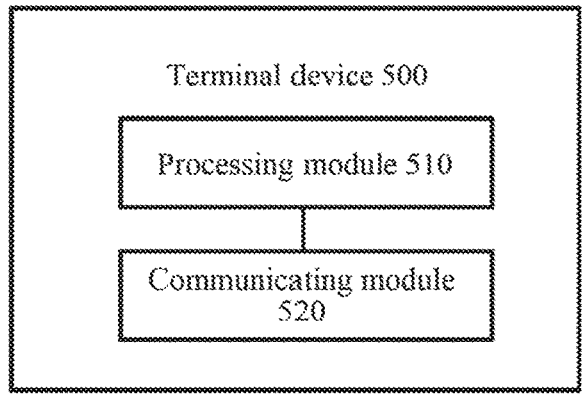

FIG. 5

SIGNAL TRANSMISSION METHOD, NETWORK DEVICE, AND TERMINAL DEVICE

CROSS-REFERENCE TO RELATED APPLICATION

This application is a continuation application of International PCT Application No. PCT/CN2018/081188 filed on Mar. 29, 2018, the entire content of which is hereby incorporated by reference.

TECHNICAL FIELD

Implementations of the present disclosure relate to the field of communication, and more specifically relate to a method for transmitting a signal, a network device, and a terminal device.

BACKGROUND

On an unlicensed spectrum, a communication device follows a principle of "Listen Before Talk (LBT)", that is, the communication device needs to first perform channel sensing before performing signal transmission on a channel of the unlicensed spectrum, and the communication device can only perform signal transmission when a channel sensing result is that the channel is idle, or when the availability of a channel is obtained; and if the channel sensing result of the communication device on the channel of the unlicensed spectrum is that the channel is busy, the communication device cannot perform signal transmission.

In New Radio (NR), a Synchronization signal/PBCH block (SSB, or SS/PBCH block) is an important signal for a terminal device to access a network and perform a Radio Resource Management (RRM) measurement. When the unlicensed spectrum is applied to a NR system, a network device must obtain an availability of a channel so as to send the SSB. In this case, how to effectively transmit the SSB by the network device is a problem worth studying.

SUMMARY

Implementations of the present disclosure provide a method for transmitting a signal, a network device and a terminal device.

In a first aspect, a method for transmitting a signal is provided, including: performing, by a network device, detection on a first carrier, and determining, from M1 time-frequency resources according to a detection result, a first time-frequency resource of which a availability of a channel is obtained, wherein the M time-frequency resources are time-frequency resources, which are available for transmitting a first Synchronization signal/PBCH block (SSB, or SS/PBCH block), configured by the network device for a first period on the first carrier, M1 is a positive integer, and M1≥2; and sending, by the network device, the first SSB to a terminal device through the first time-frequency resource.

It should be understood that the M1 time-frequency resources are available for transmitting the first SSB, or the M1 time-frequency resources may be considered as a candidate time-frequency resource available for transmitting the first SSB, but in actual transmission, the M1 time-frequency resources may not all be configured for transmitting the first SSB. Therefore, the M1 time-frequency resources may include time-frequency resources which actually transmit the first SSB and time-frequency resources which do not transmit the first SSB.

Optionally, if the channel sensing fails on all the M1 time-frequency resources, that is, the availability of a channel of none of the M1 time-frequency resources is obtained, the network device may not send the first SSB within the first period, and further, the network device may perform channel sensing on the first carrier within a second period after the first period, and send the first SSB according to a channel sensing result within the second period.

Optionally, in the implementation of the present disclosure, the first carrier may be an unlicensed carrier or may be an authorized carrier, which is not limited in the implementation of the present disclosure.

Optionally, in the implementation of the present disclosure, a length of the first period may be specified by a communication system, or may be configured by a network device, or may be determined jointly by a network device and a terminal device. The implementation of the present disclosure does not limit the mode of determining the first period.

In some possible implementations, a maximum quantity of times that the network device sends the first SSB within the first period is N1, wherein N1 is a positive integer, and 1≤N1<M1.

Therefore, the network device may only send the first SSB on part of the M1 time-frequency resources, instead of sending the first SSB on each time-frequency resource in the M1 time-frequency resources, which can reduce quantity of times that an SSB is sent, and thus can reduce a resource overhead for SSB sending.

Optionally, valuing of the N1 may be specified by the communication system, or configured by the network device, or determined jointly by the network device and the terminal device, which is not limited in the implementation of the present disclosure.

In some possible implementations, quantity of times that the network device sends the first SSB before the first time-frequency resource within the first period is less than the N1.

In some possible implementations, the method further includes: not sending, by the network device, the first SSB on a time-frequency resource later than a second time-frequency resource in the M1 time-frequency resources, wherein the second time-frequency resource is a time-frequency resource, that the network device sends the first SSB for a N1-th time, in the M1 time-frequency resources.

Therefore, after performing N1-th transmission of the first SSB on the M1 time-frequency resources, the network device may no longer transmit the first SSB on other candidate time-frequency resources in the M1 time-frequency resources. Therefore, while a sending opportunity of an SSB is increased by configuring, by the network device, multiple time-frequency resources within the first period, quantity of times that an SSB is sent can also be reduced, and thus a resource overhead of SSB sending can be reduced.

Optionally, on another candidate time-frequency resource after the second time-frequency resource, the network device may perform data transmission, thus a resource utilization rate can be improved.

In some possible implementations, the first time-frequency resource is one of K1 time-frequency resources, wherein the K1 time-frequency resources are time-frequency resources for sending the first SSB in the M1 time-frequency resources, the K1 is a positive integer, and 1≤K1≤N1.

In some possible implementations, the K1 time-frequency resources are first K1 time-frequency resources, of which availability of a channel is obtained by the network device, in the M1 time-frequency resources.

In some possible implementations, the first period includes M1 sub-periods, wherein each sub-period of the M1 sub-periods includes one of the M1 time-frequency resources, and the M1 sub-periods correspond to the M1 time-frequency resources one by one.

In some possible implementations, a position of a third time-frequency resource within the first sub-period and a position of a fourth time-frequency resource within the second sub-period are same, wherein the third time-frequency resource and the fourth time-frequency resource are two different time-frequency resources in the M1 time-frequency resources, the third time-frequency resource corresponds to the first sub-period, and the fourth time-frequency resource corresponds to the second sub-period.

In some possible implementations, the network device sends first indication information to the terminal device, wherein the first indication information is configured for indicating information that the network device sends the first SSB within the first period.

In some possible implementations, the first indication information is configured for indicating at least one of the following: information of a maximum quantity of times that the first SSB is sent within the first period, an index of the first SSB, and a beam index of the first SSB.

In some possible implementations, the network device sends the first indication information on a fifth time-frequency resource within the first period.

In some possible implementations, the first indication information is configured for indicating at least one of the following: information of quantity of times that the first SSB has been sent on a time-frequency resource earlier than the fifth time-frequency resource within the first period, information of quantity of times that the first SSB is to be sent on a time-frequency resource later than the fifth time-frequency resource within the first period, and information of a candidate position of the first SSB on a time-frequency resource later than the fifth time-frequency resource within the first period.

Therefore, the terminal device may determine information of the first SSB within the first period according to the first indication information, and may further receive the first SSB at a specific resource position according to the information of the first SSB, or no longer receive the first SSB on other time-frequency resources after receiving is successful for N1 times, which can reduce complexity of blind detection of the terminal device. Or, the terminal device may determine a time-frequency resource position of the first SSB according to the first indication information, and perform rate matching around the first SSB when performing data receiving.

In some possible implementations, the first period is determined according to at least one of the following: quantity of terminal devices served by the network device, a size of a coverage area of a cell served by the network device, and a time delay requirement for the terminal device to access the network device.

Optionally, in other implementations, the period may be determined according to a sending period of an SSB, for example, the period may be 80 ms, 160 ms, etc.

In some possible implementations, the first SSB is one SSB in an SSB group, the SSB group further includes a second SSB, and the method further includes: determining, by the network device, a sixth time-frequency resource, of which a availability of a channel is obtained, from M2 time-frequency resources, wherein the M2 time-frequency resources are time-frequency resources, which are configured for transmitting the second SSB, configured by the network device for the first period on the first carrier, the M2 is a positive integer, and M2≥2; and sending, by the network device, the second SSB to the terminal device through the sixth time-frequency resource.

In some possible implementations, the sixth time-frequency resource is one of K2 time-frequency resources, wherein the K2 time-frequency resources are time-frequency resources for sending the second SSB in the M2 time-frequency resources, the K2 is a positive integer, and 1≤K2≤N2, wherein the N2 is a maximum quantity of times that the network device sends the second SSB within the first period, the N2 is a positive integer, and 1≤N2<M2.

In some possible implementations, the K2 time-frequency resources are first K2 time-frequency resources, of which availability of a channel is obtained by the network device, in the M2 time-frequency resources.

In some possible implementations, the network device sends second indication information to the terminal device, wherein the second indication information is configured for indicating information that the network device sends the SSB group within the first period.

In some possible implementations, the second indication information is configured for indicating at least one of the following: information of a maximum quantity of times that at least one SSB in the SSB group is sent within the first period, an index of at least one SSB in the SSB group, and a beam index of at least one SSB in the SSB group.

In some possible implementations, the network device sends the second indication information on a seventh time-frequency resource within the first period.

In some possible implementations, the second indication information is configured for indicating at least one of the following: information of quantity of times that at least one SSB in the SSB group has been sent on a time-frequency resource earlier than the seventh time-frequency resource within the first period, information of quantity of times that at least one SSB in the SSB group is to be sent on a time-frequency resource later than the seventh time-frequency resource within the first period, and information of a candidate position of at least one SSB in the SSB group on a time-frequency resource later than the seventh time-frequency resource within the first period.

Therefore, the terminal device may determine information of at least one SSB in the SSB group within the first period according to the second indication information, and may further perform receiving of at least one SSB in the SSB group at a specific position according to information of the SSB group, or after a certain SSB in the SSB group has been successfully received for up to a maximum quantity of times (for example, the first SSB is received for N1 times, the second SSB is received for N2 times), no longer receive the certain SSB in the SSB group on other time-frequency resources, which can reduce complexity of blind detection of the terminal device. Or, the terminal device may determine a time-frequency resource position of the SSB group according to the second indication information, and perform rate matching around at least one SSB in the SSB group when performing data receiving.

In a second aspect, a method for transmitting a signal is provided, including: detecting, by a terminal device, a first Synchronization signal/PBCH block (SSB, or SS/PBCH block) on M1 time-frequency resources on a first carrier to determine a first time-frequency resource where a network device sends the first SSB, wherein the M1 time-frequency resources are time-frequency resources, which are available for transmitting the first SSB, configured by the network device for a first period on the first carrier, M1 is a positive integer, and M1≥2; and receiving, by the terminal device through the first time-frequency resource, the first SSB sent by the network device.

In some possible implementations, a maximum quantity of times that the network device sends the first SSB within the first period is N1, wherein N1 is a positive integer, and 1≤N1<M1.

In some possible implementations, quantity of times that the terminal device detects the first SSB before the first time-frequency resource within the first period is less than the N1.

In some possible implementations, the method further includes: not detecting, by the terminal device, the first SSB on a time-frequency resource later than a second time-frequency resource in the M1 time-frequency resources, wherein the second time-frequency resource is a time-frequency resource, that the terminal device detects the first SSB for a N1-th time, in the M1 time-frequency resources.

In some possible implementations, the first time-frequency resource is one of K1 time-frequency resources, wherein the K1 time-frequency resources are time-frequency resources, that the terminal device detects the first SSB, in the M time-frequency resources, the K1 is a positive integer, and 1≤K1≤N1.

In some possible implementations, the K1 time-frequency resources are first K1 time-frequency resources, that the terminal device detects the first SSB, in the M1 time-frequency resources.

In some possible implementations, the first period includes M sub-periods, wherein one of the M1 time-frequency resources is included within each sub-period of the M1 sub-periods, and the M1 sub-periods correspond to the M1 time-frequency resources one by one.

In some possible implementations, a position of a third time-frequency resource within the first sub-period and a position of a fourth time-frequency resource within the second sub-period are same, wherein the third time-frequency resource and the fourth time-frequency resource are two different time-frequency resources in the M1 time-frequency resources, the third time-frequency resource corresponds to the first sub-period, and the fourth time-frequency resource corresponds to the second sub-period.

In some possible implementations, the terminal device receives first indication information sent by the network device, wherein the first indication information is configured for indicating information that the network device sends the first SSB within the first period.

In some possible implementations, the first indication information is configured for indicating at least one of the following: information of a maximum quantity of times that the first SSB is sent within the first period, an index of the first SSB, and a beam index of the first SSB.

In some possible implementations, the terminal device receives the first indication information on a fifth time-frequency resource within the first period.

In some possible implementations, the first indication information is configured for indicating at least one of the following: information of quantity of times that the first SSB has been sent on a time-frequency resource earlier than the fifth time-frequency resource within the first period, information of quantity of times that the first SSB is to be sent on a time-frequency resource later than the fifth time-frequency resource within the first period, and information of a candidate position of the first SSB on a time-frequency resource later than the fifth time-frequency resource within the first period.

Therefore, the terminal device may determine information of the first SSB within the first period according to the first indication information, and may further perform receiving of the first SSB at a specific resource position according to the information of the first SSB, or no longer perform receiving of the first SSB on other time-frequency resources after receiving is successful for N1 times, which can reduce complexity of blind detection of the terminal device. Or, the terminal device may determine a time-frequency resource position of the first SSB according to the first indication information, and perform rate matching around the first SSB when performing data receiving.

In some possible implementations, the first period is determined according to at least one of the following: quantity of terminal devices served by the network device, a size of a coverage area of a cell served by the network device, and a time delay requirement for the terminal device to access the network device.

In some possible implementations, the first SSB is one SSB in an SSB group, the SSB group further includes a second SSB, and the method further includes: detecting, by the terminal device, the second SSB in M2 time-frequency resources on the first carrier to determine a sixth time-frequency resource where the network device sends the second SSB, wherein the M2 time-frequency resources are time-frequency resources, which are configured for transmitting the second SSB, configured by the network device for the first period on the first carrier, M2 is a positive integer, and M2≥2; and receiving, by the terminal device through the sixth time-frequency resource, the second SSB sent by the network device.

In some possible implementations, the sixth time-frequency resource is one of K2 time-frequency resources, wherein the K2 time-frequency resources are time-frequency resources for sending the second SSB in the M2 time-frequency resources, the K2 is a positive integer, and 1≤K2≤N2, wherein the N2 is a maximum quantity of times that the network device sends the second SSB within the first period, the N2 is a positive integer, and 1≤N2≤M2.

In some possible implementations, the K2 time-frequency resources are first K2 time-frequency resources, of which availability of a channel is obtained by the network device, in the M2 time-frequency resources.

In some possible implementations, the terminal device receives second indication information sent by the network device, wherein the second indication information is configured for indicating information that the network device sends the SSB group within the first period.

In some possible implementations, the second indication information is configured for indicating at least one of the following: information of a maximum quantity of times that at least one SSB in the SSB group is sent within the first period, an index of at least one SSB in the SSB group, and a beam index of at least one SSB in the SSB group.

In some possible implementations, the terminal device receives the second indication information on a seventh time-frequency resource within the first period.

In some possible implementations, the second indication information is configured for indicating at least one of the following: information of quantity of times that at least one SSB in the SSB group has been sent on a time-frequency resource earlier than the seventh time-frequency resource within the first period, information of quantity of times that at least one SSB in the SSB group is to be sent on a time-frequency resource later than the seventh time-frequency resource within the first period, and information of a candidate position of at least one SSB in the SSB group on a time-frequency resource later than the seventh time-frequency resource within the first period.

Therefore, the terminal device may determine information of at least one SSB in the SSB group within the first period according to the second indication information, and may further perform receiving of at least one SSB in the SSB group at a specific position according to information of the SSB group, or after a certain SSB in the SSB group has been successfully received for up to a maximum quantity of times (for example, the first SSB is received for N1 times, the second SSB is received for N2 times), no longer receive the certain SSB in the SSB group on other time-frequency resources, which can reduce complexity of blind detection of the terminal device. Or, the terminal device may determine a time-frequency resource position of the SSB group according to the second indication information, and perform rate matching around at least one SSB in the SSB group when performing data receiving.

In a third aspect, a network device is provided for performing the method in the first aspect or any possible implementation of the first aspect. Specifically, the network device includes units for performing the method of the above first aspect or in any possible implementation of the first aspect.

In a fourth aspect, a terminal device is provided, including a memory, a processor, an input interface and an output interface. The memory, the processor, the input interface and the output interface are connected through a bus system. The memory is configured for storing instructions, and the processor is configured for executing the instructions stored in the memory for executing the method of the first aspect or any one of the possible implementations of the first aspect.

In a fifth aspect, a network device is provided for executing the method in the second aspect or the method in any possible implementation of the second aspect described above. Specifically, the network device includes units for performing the method of the above second aspect or in any possible implementation of the second aspect.

In a sixth aspect, a terminal device is provided, including a memory, a processor, an input interface and an output interface. The memory, the processor, the input interface and the output interface are connected through a bus system. The memory is configured for storing instructions, and the processor is configured for executing the instructions stored in the memory for executing the method of the second aspect or any one of the possible implementations of the second aspect.

In a seventh aspect, a computer storage medium is provided for storing computer software instructions for executing the method of the first aspect or any possible implementation of the first aspect, and the computer software instructions include programs designed for executing the aspect.

In an eighth aspect, a computer program product containing instructions is provided, when the instructions are run on a computer, the computer is caused to perform the method of the first aspect or any one of optional implementations of the first aspect.

In a ninth aspect, a computer storage medium is provided for storing computer software instructions for executing the method of the second aspect or any possible implementation of the second aspect, and the computer software instructions include programs designed for executing the aspect.

In a tenth aspect, a computer program product containing instructions is provided, when the instructions are run on a computer, the computer is caused to perform the method of the second aspect or any one of optional implementations of the second aspect.

BRIEF DESCRIPTION OF DRAWINGS

FIG. 3 shows a schematic flowchart of a method for transmitting a signal according to another implementation of the present disclosure.

FIG. 4 shows a block diagram of a network device according to an implementation of the present disclosure.

FIG. 5 shows a block diagram of a terminal device according to an implementation of the present disclosure.

DETAILED DESCRIPTION

Figures 1, 2:
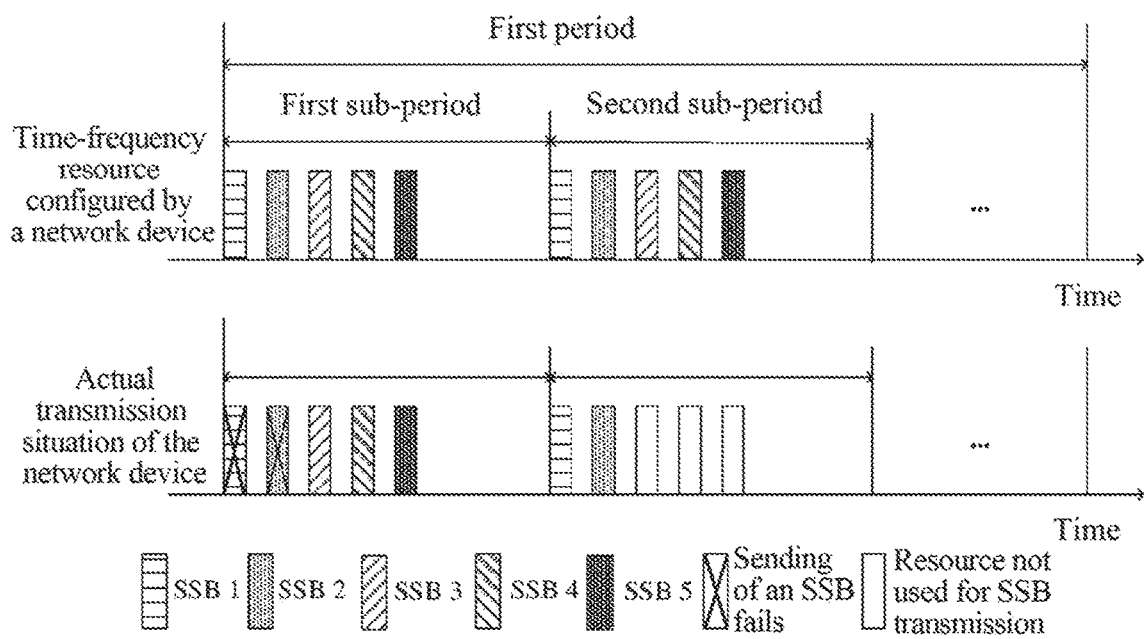
FIG. 1 shows a schematic flowchart of a method for transmitting a signal according to an implementation of the present disclosure.
FIG. 2 shows a schematic flowchart of an example of a method for transmitting a signal according to an implementation of the present disclosure.

In the following, a technical solution in implementations of the present disclosure will be described in combination with drawings of the implementations of the present disclosure.

Implementations of the present disclosure may be applied to various communication systems, such as a Global System of Mobile Communication (GSM) system, a Code Division Multiple Access (CDMA) system, a Wideband Code Division Multiple Access (WCDMA) system, General Packet Radio Service (GPRS), a Long Term Evolution (LTE) system, an Advanced long term evolution (LTE-A) system, a New Radio (NR) system, an evolution system of an NR system, an LTE-based access to unlicensed spectrum (LTE-U) system, an NR-based access to unlicensed spectrum (NR-U) system, a Universal Mobile Telecommunication System (UMTS), Wireless Local Area Networks (WLAN), Wireless Fidelity (WiFi), a next generation communication System or another communication system, etc.

Generally speaking, quantity of connections supported by a traditional communication system is limited and easy to implement. However, with the development of communication technologies, a mobile communication system will not only support traditional communication, but also support, for example, Device to Device (D2D) communication, Machine to Machine (M2M) communication, Machine Type Communication (MTC), or Vehicle to Vehicle (V2V) communication, etc. The implementations of the present disclosure may also be applied to these communication systems.

Optionally, a communication system in the implementations of the present disclosure may be applied to a Carrier Aggregation (CA) scenario, or a Dual Connectivity (DC) scenario, or a Standalone (SA) network deployment scenario.

The implementations of the present disclosure do not limit an applied spectrum. For example, the implementations of the present disclosure may be applied to an authorized spectrum, or an unlicensed spectrum.

The implementations of the present disclosure describe various implementations in combination with a network device and a terminal device, wherein the terminal device may also be referred to as a User Equipment (UE), an access terminal, a user unit, a user station, a mobile station, a mobile platform, a remote station, a remote terminal, a mobile device, a user terminal, a terminal, a wireless communication device, a user agent or a user apparatus, etc. The terminal device may be a STATION (ST) in a WLAN, a cellular phone, a cordless phone, a Session Initiation Protocol (SIP) phone, a Wireless Local Loop (WLL) station, a Personal Digital Assistant (PDA) device, a handheld device with a wireless communication function, a computing device or another processing device connected to a wireless modem, an on-board device, a wearable device or a next generation communication system, e.g., a terminal device in an NR network, or a terminal device in a future evolved Public Land Mobile Network (PLMN), etc.

As an example but not a limitation, in the implementations of the present disclosure, the terminal device may also be a wearable device. The wearable device may also be referred to as a wearing type smart device, which is a general term of a device which may be worn and is designed intelligently and developed for daily wearing applying a wearing type technology, such as glasses, gloves, watches, clothing and shoes. The wearable device is a portable device which is worn directly on the body or integrated into a user's clothes or accessory. The wearable device is not only a hardware device, but also achieves a powerful function through software support as well as data interaction and cloud interaction. A generalized wearing type smart device includes, for example, a smart watch or smart glasses, etc., that has full functions, a large size, and may achieve full or partial functions without relying on a smart phone, as well as, for example, various smart bracelets or smart jewelry for physical sign monitoring or the like, that focuses on a certain type of application functions and needs to be used together with another device such as a smart phone.

The network device may be a device for communicating with the mobile device, or may be an Access Point (AP) in the WLAN, or a Base Transceiver Station (BTS) in GSM or CDMA, or may be a NodeB (NB) in WCDMA, or may be an Evolutional Node B (eNB or eNodeB) in the LTE, or a relay station or an access point, or an in-vehicle device, a wearable device, as well as a network device in the NR network or a network device in the future evolved PLMN network.

In the implementation of the present disclosure, the network device provides a service for a cell, and the terminal device communicates with the network device through a transmission resource (e.g., a frequency domain resource or a spectrum resource) used by the cell. The cell may be a cell corresponding to the network device (e.g., a base station), the cell may belong to a macro base station, or may belong to a base station corresponding to a Small cell. The Small cell here may include: a Metro cell, a Micro cell, a Pico cell, a Femto cell, etc. These Small cells have characteristics of small coverage and a low transmitting power, and are suitable for providing a high-speed data transmission service.

Optionally, a downlink physical channel of the implementations of the present disclosure may include a Physical Downlink Control Channel (PDCCH), an Enhanced Physical Downlink Control Channel (EPDCCH), a Physical Downlink Shared Channel (PDSCH), a Physical Hybrid ARQ Indicator Channel (PHICH), a Physical Multicast Channel (PMCH), a Physical Broadcast Channel (PBCH), etc. A downlink reference signal may include a downlink Synchronization Signal, a PPhase Tracking Reference Signal (PT-RS), a downlink DeModulation Reference Signal (DMRS), a Channel State Information-Reference Signal (CSI-RS), etc., wherein the downlink Synchronization Signal may be configured for a communication device to access a network and a radio resource management measurement, the downlink DMRS may be configured for downlink channel demodulation, the CSI-RS may be configured for a downlink channel measurement, or downlink time-frequency synchronization or phase tracking, the PT-RS may also be configured for a downlink channel measurement, or downlink time-frequency synchronization or phase tracking. It should be understood that the implementations of the present disclosure may include a downlink physical channel or a downlink reference signal with a same name and a different function as the above, or may include a downlink physical channel or a downlink reference signal with a different name and a same function as the above, which is not limited in the present disclosure.

Optionally, an uplink physical channel of the implementations of the present disclosure may include a Physical Random Access CHannel (PRACH), a Physical Uplink Control CHannel (PUCCH), or a Physical Uplink Shared Channel (PUSCH), etc. The uplink reference signal may include an uplink DeModulation Reference Signal (DMRS), a Sounding Reference Signal (SRS), or a Phase Tracking Reference Signal (PT-RS), etc. Among them, the uplink DMRS may be configured for demodulation of an uplink channel, the SRS may be configured for a measurement of an uplink channel, uplink time-frequency synchronization or phase tracking, the PT-RS may also be configured for a measurement of an uplink channel, uplink time-frequency synchronization or phase tracking. It should be understood that the implementations of the present disclosure may include an uplink physical channel or an uplink reference signal with a same name and a different function as the above, or may include an uplink physical channel or an uplink reference signal with a different name and a same function as the above, which is not limited in the present disclosure.

A method for transmitting a signal of an implementation of the present disclosure will be described below with reference to FIGS. 1 to 3. It should be understood that FIGS. 1 to 3 are schematic flow charts of the method for transmitting the signal of the implementation of the present disclosure, showing detailed communication acts or operations of the method, but these acts or operations are only an example, and the implementation of the present disclosure may also perform another operation or a variation of various operations in FIGS. 1 to 3.

In addition, the various acts in FIGS. 1 to 3 may be respectively performed in an order different from what is shown in FIGS. 1 to 3, and it is possible that not all operations in FIGS. 1 to 3 are to be performed.

FIG. 1 is a schematic flow chart of a method for transmitting a signal according to an implementation of the present disclosure. As shown in FIG. 1, the method 100 includes following acts.

In S110, a network device performs detection on a first carrier, and determines, from M1 time-frequency resources according to a detection result, a first time-frequency resource of which a availability of a channel is obtained, wherein the M1 time-frequency resources are time-frequency resources, which are available for transmitting a first synchronization signal/PBCH block (SSB, or SS/PBCH block), configured by the network device for a first period on the first carrier, M1 is a positive integer, and M≥2; and S120, the network device sends the first SSB to a terminal device through the first time-frequency resource.

Specifically, the network device may configure M1 time-frequency resources for the first period on the first carrier, wherein the M1 time-frequency resources are time-frequency resources which the network device can use to transmit the first SSB within the first period on the first carrier, that is, the M1 time-frequency resources are available for transmitting the first SSB, or the M1 time-frequency resources may be considered as candidate time-frequency resources which can be configured for transmitting the first SSB. However, in actual transmission, whether the M1 time-frequency resources are all configured for transmitting the first SSB is not limited by the implementation of the present disclosure, that is, the M1 time-frequency resources may include time-frequency resources actually configured for transmitting the first SSB and time-frequency resources not configured for transmitting the first SSB.

For example, the M1 time-frequency resources include a time-frequency resource 1, a time-frequency resource 2, and a time-frequency resource 3, then the time-frequency resource 1, the time-frequency resource 2, and the time-frequency resource 3 are time-frequency resources which are available for transmitting the first SSB. In actual transmission, if the first SSB is transmitted only on the time-frequency resource 1, the time-frequency resource 1 is a time-frequency resource actually configured for transmitting the first SSB, and the time-frequency resource 2 and the time-frequency resource 3 are time-frequency resources not configured for transmitting the first SSB.

Optionally, in the implementation of the present disclosure, at least one of the M1 time-frequency resources is not configured for transmitting the first SSB.

In the implementation of the present disclosure, the network device may perform channel sensing on the first carrier, and determine which time-frequency resources in the M1 time-frequency resources are available according to a channel sensing result, that is, availability of a channels of which time-frequency resources have been obtained. For example, if the channel sensing result on the time-frequency resource K in the M1 time-frequency resources is that the channel is idle, the time-frequency resource K may be determined to be available, that is, the availability of a channel of the time-frequency resource K is obtained, otherwise, the time-frequency resource K may be determined to be unavailable, that is, the availability of a channel of the time-frequency resource K is not obtained. Herein, the time-frequency resource the availability of a channel of which is obtained may include a first time-frequency resource, and further, the network device may send the first SSB to the terminal device through the first time-frequency resource.

Therefore, in the implementation of the present disclosure, the network device may configure multiple time-frequency resources available for transmitting the first SSB within a first period, which is beneficial to increasing a sending opportunity of an SSB, and the network device may perform channel sensing on a first carrier, and determine a first time-frequency resource available in M1 time-frequency resources within the first period according to a channel sensing result, and further may send the first SSB through the first time-frequency resource, instead of sending the first SSB on each time-frequency resource or a specific time-frequency resource in the M1 time-frequency resources, which can achieve effective transmission of the first SSB, and is beneficial to improving a resource utilization efficiency.

Optionally, in the implementation of the present disclosure, the first time-frequency resource may include one time-frequency resource or may include multiple time-frequency resources.

Optionally, in the implementation of the present disclosure, the first carrier may be an unlicensed carrier or may be an authorized carrier, which is not limited in the implementation of the present disclosure.

It need be noted that if the network device has already obtained a availability of a channel before the first time-frequency resource (for example, the network device has already started performing data transmission before the first time-frequency resource), in this case, the network device may perform channel sensing on the first carrier on a time resource before performing data transmission, and accordingly, the network device may consider that the availability of a channel of the first time-frequency resource has been obtained without performing channel sensing again; or, the network device may perform channel sensing before the first time-frequency resource to determine whether the first time-frequency resource is available, so as to perform sending of the first SSB in a case that it is available. It should be understood that the implementation of the present disclosure does not particularly limit a specific position where the network device performs channel sensing on the first carrier, as long as whether the M1 time-frequency resources are available can be determined according to the channel sensing result.

Optionally, in the implementation of the present disclosure, if the channel sensing fails on all the M1 time-frequency resources, that is, a availability of a channel of none of the M1 time-frequency resources is obtained, the network device may not perform sending of the first SSB within the first period, and further, the network device may perform channel sensing on the first carrier within a second period after the first period, and perform sending of the first SSB according to a channel sensing result within the second period. A specific implementation process refers to the implementation process within the first period, which will not be repeated here.

It should be understood that quantity of times that the network device sends the first SSB within the first period or the second period may be related to the situation that the network device obtains availability of a channels within the period. For example, the network device may not send the first SSB within the first period and send the first SSB once within the second period.

Optionally, when the network device configures a candidate time-frequency resource of an SSB, the candidate time-frequency resource is configured on a periodic basis, that is, the candidate time-frequency resource of the SSB within each period is configured same. Herein the first period is one period in the configuration period, the second period is another period in the configuration period, a length of the first period and a length of the second period are same, and the second period is located after the first period. For example, a period that the network device configures a candidate time-frequency resource of an SSB is 80 ms. Assuming that the first period corresponds to 1-80 ms, the second period may correspond to 81-160 ms.

Optionally, a length of the candidate time-frequency resource configuration period may be one of 40 ms, 80 ms, or 160 ms, etc.

Optionally, in the implementation of the present disclosure, a length of the candidate time-frequency resource configuration period (i.e., the length of the first period) may be specified by a communication system, or may be configured by the network device, or may be determined jointly by the network device and the terminal device. The implementation of the present disclosure does not limit a mode of determining the length of the first period.

Optionally, in some implementations, the length of the first period may be determined according to at least one of the following: quantity of terminal devices served by the network device, a size of a coverage area of a cell served by the network device, and a time delay requirement for the terminal device to access the network device.

For example, when the quantity of terminal devices served by the network device is large, a short first period may be configured, so that when a terminal device wants to perform initial access or initiate random access, the SSB may be obtained in time, which is beneficial to shortening a time delay of the terminal device accessing a network, improving a user experience; or, when the coverage area of the cell served by the network device is large, a short first period may be configured, and the large coverage area of the cell may also be considered to be a large quantity of terminal devices served by the network device to some extent, so configuring a short first period is beneficial for the terminal device to obtain an SSB in time and perform fast initial access when it wants to access a network; or, when an access delay requirement of the terminal device is high, a frequency that the network device sends an SSB is required to be high, so configuring a short first period is beneficial for the terminal device to obtain an SSB in time and perform fast access when it wants to initiate initial access.

For another example, the first period may be determined according to at least two of the quantity of the terminal devices served by the network device, the size of the coverage area of the cell served by the network device, and the time delay requirement for the terminal device to access the network device. For example, when the coverage area of the cell served by the network device is greater than a specific threshold and the time delay requirement for the terminal device to access a network is higher than a specific threshold, a short first period is configured, or, when the quantity of the terminal devices served by the network device is less than a specific threshold and a range of the cell served by the network device is less than a specific threshold, a long first period is configured, etc., which is not limited by the implementation of the present disclosure.

Optionally, in some implementations, a maximum quantity of times that the network device sends the first SSB within the first period is N1, wherein N1 is a positive integer, and $1 \leq N1 < M1$.

Optionally, the network device or the communication system determines the maximum quantity of times that the first SSB is sent within the first period according to at least one of the length of the first period, the quantity of the terminal devices served by the network device, the size of the coverage area of the cell served by the network device and the time delay requirement for the terminal device to access the network device.

Therefore, in the implementation of the present disclosure, the network device may only send the first SSB on part of the M1 time-frequency resources, instead of sending the first SSB on each time-frequency resource in the M1 time-frequency resources, which can reduce quantity of times that an SSB is sent, and thus can reduce a resource overhead of sending an SSB.

Optionally, value of the N1 may be specified by the communication system, or configured by the network device, or determined jointly by the network device and the terminal device, which is not limited in the implementation of the present disclosure.

Optionally, in some implementations, quantity of times that the network device sends the first SSB before the first time-frequency resource within the first period is less than the N1.

That is, the first time-frequency resource may be a time-frequency resource configured for one of N1 transmissions of the first SSB, for example, the first time-frequency resource may be configured for the first transmission of the first SSB, or may be configured for the N1-th transmission of the first SSB, or may be configured for an intermediate one of the N1 transmissions, which is not limited in the implementation of the present disclosure.

Optionally, in some implementations, the method 100 further includes: the network device does not send the first SSB on a time-frequency resource later than a second time-frequency resource in the M1 time-frequency resources, wherein the second time-frequency resource is a time-frequency resource, that the network device sends the first SSB for a N1-th time, in the M1 time-frequency resources.

Specifically, the network device may use N1 time-frequency resources, of which availability of a channels are obtained, of the M1 time-frequency resources for N1 transmissions of the first SSB, wherein the second time-frequency resource is a time-frequency resource configured for the N1-th transmission in the N1 transmissions, then the network device does not send the first SSB on other time-frequency resources after the second time-frequency resource in the M1 time-frequency resources again, that is, after performing the N1 transmissions of the first SSB on the M1 time-frequency resources, the network device does not transmit the first SSB on other candidate time-frequency resources in the M1 time-frequency resources again. Therefore, according to the method for transmitting the signal of the implementation of the present disclosure, in a case of increasing a transmission opportunity of an SSB and achieving effective transmission of the SSB, sending times of the SSB can also be reduced, thus resource overhead of sending the SSB can be reduced.

Optionally, in some implementations, on another candidate time-frequency resource after the second time-frequency resource, the network device may perform data transmission, thus a resource utilization rate can be improved.

Optionally, if the first time-frequency resource is a time-frequency resource for the N1-th transmission of the first SSB, the first time-frequency resource and the second time-frequency resource are same.

Optionally, in some implementations, the first time-frequency resource is one of K1 time-frequency resources, wherein the K1 time-frequency resources are time-frequency resources for sending the first SSB in the M1 time-frequency resources, the K1 is a positive integer, and $1 \leq K1 \leq N1$.

It should be understood that the K1 time-frequency resources here are time-frequency resources actually configured for transmitting the first SSB, or, transmission of the first SSB is performed on the K1 time-frequency resources, i.e. the network device performs K1 transmissions of the first SSB on the K1 time-frequency resources, wherein the first time-frequency resource may be one of the K1 time-frequency resources. Optionally, the first time-frequency resource may be a time-frequency resource configured for any one of the K1 transmissions. The implementation of the present disclosure does not specifically limit a position of the first time-frequency resource in the K1 time-frequency resources.

Optionally, in some implementations, the K1 time-frequency resources are first K1 time-frequency resources, of which availability of a channel is obtained by the network device, in the M1 time-frequency resources.

For example, if the network device obtains availability of a channel on P time-frequency resources of the M1 time-frequency resources, wherein P≥K1, the K1 time-frequency resources may be first K1 time-frequency resources of the P time-frequency resources, wherein the K1 time-frequency resources respectively correspond to K1 transmissions of the first SSB.

Optionally, in some implementations, the first period includes M1 sub-periods, wherein one of the M1 time-frequency resources is included within each sub-period of the M1 sub-periods, that is, the M1 sub-periods correspond to the M1 time-frequency resources one by one.

In other words, one candidate time-frequency resource capable of being configured for transmitting the first SSB may be configured within each sub-period of the M1 sub-periods. Optionally, a position of a candidate time-frequency resource capable of being configured for transmitting the first SSB within each sub-period is same.

For example, the first period includes a first sub-period and a second sub-period, and the M1 time-frequency resources include a third time-frequency resource and a fourth time-frequency resource, wherein the third time-frequency resource is a candidate time-frequency resource within the first sub-period and the fourth time-frequency resource is a candidate time-frequency resource within the second sub-period, then a position of the third time-frequency resource within the first sub-period and a position of the fourth time-frequency resource within the second sub-period are same.

It should be understood that the K1 time-frequency resources actually configured for transmitting the first SSB may respectively correspond to K1 sub-periods, wherein the K1 sub-periods may be continuous or discontinuous in the M1 sub-periods, which is not limited in the implementation of the present disclosure.

Optionally, in some implementations, the network device may send first indication information to the terminal device, wherein the first indication information is configured for indicating information that the network device sends the first SSB within the first period.

Optionally, the first indication information is configured for indicating at least one of the following: information of a maximum quantity of times that the first SSB is sent within the first period, an index of the first SSB, and a beam index of the first SSB.

Optionally, beam indication information of one beam may include a signal index or a beam index of a reference signal satisfying a Quasi-Co-location (QCL) relationship with the beam.

Optionally, in the implementation of the present disclosure, a beam configured for receiving one signal may be understood as a Spatial domain reception filter configured for receiving one signal; and a beam configured for sending one signal may be understood as a Spatial domain transmission filter configured for sending one signal. For two signals sent with a same spatial domain transmission filter, it may be considered that these two signals are QCL with respect to a spatial reception parameter.

As an example but not a limitation, the first indication information may be configured for indicating information of the index of the first SSB to be sent by the network device within the first period, quantity of times, a resource position, a beam index used to send the first SSB, etc.

Thus, the terminal device may determine information of the resource position of the first SSB, sending times, etc. according to the first indication information, and may further receive the first SSB at a specific resource position, or only receive the first SSB for a specific quantity of times, or the like, which is beneficial to reducing complexity of blind detection of the terminal device.

Optionally, in a specific implementation, the network device may send the first indication information on a fifth time-frequency resource within the first period.

In this case, the first indication information is configured for indicating at least one of the following: information of quantity of times that the first SSB has been sent on a time-frequency resource earlier than the fifth time-frequency resource within the first period, information of quantity of times that the first SSB is to be sent on a time-frequency resource later than the fifth time-frequency resource within the first period, and information of a candidate position of the first SSB on a time-frequency resource later than the fifth time-frequency resource within the first period.

Therefore, the terminal device may determine information of the first SSB within the first period according to the first indication information, and may further perform receiving of the first SSB according to the information of the first SSB. For example, the first SSB may be received at a specific resource position, or the first SSB is not continued to be received on other time-frequency resources again after receiving is successful for N1 times, or the like, which can reduce complexity of blind detection of the terminal device. Or, the terminal device may determine a time-frequency resource position of the first SSB according to the first indication information, and perform rate matching around the first SSB when performing data receiving.

Optionally, performing rate matching according to a time-frequency resource position of an SSB in the implementation of the present disclosure may refer to: when a time-frequency resource, which is scheduled to be configured for data transmission, of the terminal device includes a candidate time-frequency resource of the SSB, the terminal device needs to perform rate matching according to an SSB actually sent. As an example but not a limitation, the first indication information indicates that one candidate time-frequency resource is configured for sending the first SSB, and the terminal device may assume that the one time-frequency resource is not configured for data transmission when performing receiving of data, or the first indication information indicates that one candidate time-frequency resource is not configured for sending the first SSB, and the terminal device may assume that the one time-frequency resource is configured for data transmission when performing receiving of data.

It should be understood that a time-frequency resource of the implementation of the present disclosure may include a time-domain resource and/or a frequency-domain resource, wherein a time-frequency resource earlier than the fifth time-frequency resource may be a time-frequency resource earlier than the fifth time-frequency resources in a time domain dimension, and a time-frequency resource later than the fifth time-frequency resources may be a time-frequency resource later than the fifth time-frequency resource in the time domain dimension, and a frequency-domain position is not specifically limited.

Optionally, in some implementations, the first SSB is one SSB in an SSB group, the SSB group further includes a second SSB, and the method 100 may further include: the network device determines a sixth time-frequency resource, of which a availability of a channel is obtained, from M2 time-frequency resources, wherein the M2 time-frequency resources are time-frequency resources, which are configured for transmitting the second SSB, configured by the network device for the first period on the first carrier, the M2 is a positive integer, and M2≥2; and the network device sends the second SSB to the terminal device through the sixth time-frequency resource.

Therefore, the method for transmitting the signal according to the implementation of the present disclosure may be configured for sending a group of SSBs, wherein a specific implementation process of sending the second SSB in the SSB group is similar to the specific implementation process of sending the first SSB, may refer to the relevant description of the aforementioned implementation, which will not be repeated here.

Optionally, the sixth time-frequency resource is one of K2 time-frequency resources, wherein the K2 time-frequency resources are time-frequency resources for sending the second SSB in the M2 time-frequency resources, the K2 is a positive integer, and 1≤K2≤N2, wherein the N2 is a maximum quantity of times that the network device sends the second SSB within the first period, the N2 is a positive integer, and 1≤N2<M2.

It should be understood that the sixth time-frequency resource is similar to the first time-frequency resource, the sixth time-frequency resource may be a resource used in one of K2 transmissions of the second SSB, and the sixth time-frequency resource may refer to the relevant description of the aforementioned first time-frequency resource, which will not be repeated here.

Optionally, in some implementations, the N2 may be equal to the aforementioned N1, that is, maximum quantities of times that the first SSB and the second SSB are transmitted may be same.

Similar to the N1, the N2 may also be specified by the communication system, or configured by the network device, or determined jointly by the network device and the terminal device, etc., which is not limited in the implementation of the present disclosure.

Optionally, in some implementations, the K2 time-frequency resources are first K2 time-frequency resources, of which availability of a channel is obtained by the network device, in the M2 time-frequency resources.

It should be understood that the K2 time-frequency resources are similar to the aforementioned K1 time-frequency resources, and for details, please refer to the relevant description of the K1 time-frequency resources, which will not be repeated here.

Optionally, in some implementations, the M2 may be equal to the aforementioned M1, that is, one of the M2 time-frequency resources may be included within each sub-period within the first period, that is, the M1 sub-period may correspond to the M2 time-frequency resources one by one. Optionally, each time-frequency resource in the M2 time-frequency resources has a same position within a sub-period corresponding to the time-frequency resource in the M1 sub-periods.

It should be understood that the M1 and the M2 may be determined independently or uniformly, which is not limited in the present disclosure. For example, the network device configures an M value, which corresponds to be in the present disclosure, M=M, and M2=M.

It should be understood that the N1 and the N2 may be determined independently or uniformly, which is not limited in the present disclosure. For example, the network device configures an N value, which corresponds to be in the present disclosure, N1=N, and N2=N.

As an example but not a limitation, the SSB group includes S SSBs, the network device configures M groups of time-frequency resources within the first period, each group of time-frequency resources in the M groups of time-frequency resources include S time-frequency resources, wherein the S time-frequency resources are respectively configured for sending the S SSBs, and the network device configures a maximum quantity of times that the SSB group is sent to be N, that is, a maximum quantity of times that each SSB in the SSB group is sent is N. Herein the first period includes M sub-periods, the M groups of time-frequency resources correspond to the M sub-periods, and each group of time-frequency resources in the M groups of time-frequency resources have a same position within a corresponding sub-period in the M sub-periods.

Optionally, in some implementations, the network device sends second indication information to the terminal device, wherein the second indication information is configured for indicating information that the network device sends the SSB group within the first period.

Optionally, in some implementations, the second indication information is configured for indicating at least one of the following: information of a maximum quantity of times that at least one SSB in the SSB group is sent within the first period, an index of at least one SSB in the SSB group, and a beam index of at least one SSB in the SSB group.

As an example but not a limitation, the second indication information may be configured for indicating at least one of quantity of times that at least one SSB in the SSB group has been sent currently, quantity of times that it has not been sent, a maximum quantity of times that it is sent, a resource position which is subsequently available to sending the at least one SSB, a beam index available to sending the at least one SSB, or an index of the at least one SSB, etc.

Optionally, in a specific implementation, the network device sends the second indication information on a seventh time-frequency resource within the first period, wherein the second indication information is configured for indicating at least one of the following: information of quantity of times that at least one SSB in the SSB group has been sent on a time-frequency resource earlier than the seventh time-frequency resource within the first period, information of quantity of times that at least one SSB in the SSB group is to be sent on a time-frequency resource later than the seventh time-frequency resource within the first period, and information of a candidate position of at least one SSB in the SSB group on a time-frequency resource later than the seventh time-frequency resource within the first period.

Thus, the terminal device may determine information of at least one SSB in the SSB group within the first period according to the second indication information, and may further perform receiving of at least one SSB in the SSB group at a specific position according to information of the SSB group, or after a certain SSB in the SSB group has been successfully received for up to a maximum quantity of times (for example, the first SSB is received for N1 times, the second SSB is received for N2 times), no longer receive the certain SSB in the SSB group on other time-frequency resources, which can reduce complexity of blind detection of the terminal device. Or, the terminal device may determine a time-frequency resource position of the SSB group according to the second indication information, and perform rate matching around at least one SSB in the SSB group when performing data receiving.

It should be understood that a time-frequency resource earlier than the seventh time-frequency resource may be a time-frequency resource earlier than the seventh time-frequency resources in a time domain dimension, and a time-frequency resource later than the seventh time-frequency resources may be a time-frequency resource later than the seventh time-frequency resource in the time domain dimension, and a size on a frequency-domain dimension is not specifically limited.

Hereinafter, a method for transmitting a signal according to an implementation of the present disclosure will be described with reference to a specific example shown in FIG. 2.

In the example shown in FIG. 2, an SSB group may include SSB1, SSB2, SSB3, SSB4 and SSB5, and a maximum quantity of times that each SSB is transmitted is 1. Of course, the maximum quantity of transmissions of each SSB may also be greater than 1, or a maximum quantity of transmissions corresponding to each SSB may be different, and quantity of SSBs included in the SSB group may also be another quantity, and in another case, signal transmission may be performed using a similar mode without further description.

In the FIG. 2, a time-frequency resource (i.e., a candidate time-frequency resource) available for transmitting each SSB in the SSB group is configured within each sub-period, and the network device may perform channel sensing on a first carrier to determine whether each candidate time-frequency resource within a first sub-period within the first period (i.e., the first sub-period within the first period) is available.

If within the first sub-period, the time-frequency resources available for transmitting the SSB1 and the SSB2 are unavailable and the time-frequency resources available for transmitting the SSB3 to the SSB5 are available, the network device may respectively transmit, within the first sub-period, the SSB3 to the SSB5 on the time-frequency resources available for transmitting the SSB3 to the SSB5, and not perform transmission of the SSB1 and the SSB2 within the first sub-period. Since a maximum quantity of transmissions has been reached for the SSB3 to the SSB5, the network device may not perform transmission of the SSB3 to the SSB5 within a second sub-period after the first sub-period.

The network device may perform channel sensing on the first carrier, determine whether the time-frequency resources available for transmitting the SSB1 and the SSB2 within the second sub-period are available according to a channel sensing result, and if the time-frequency resources available for transmitting the SSB1 and the SSB2 are all available, the network device may respectively perform, within the second sub-period, transmission of the SSB1 and the SSB2 in the time-frequency resources available for transmitting the SSB1 and the SSB2. Or if the time-frequency resources available for transmitting the SSB1 and the SSB2 are not available within the second sub-period, further, the network device may perform channel sensing on the first carrier and determine whether sending of the SSB1 and the SSB2 may be performed within a third sub-period according to a channel sensing result.

For a terminal device, if the terminal device is in an initial access state, since the terminal device does not know configuration of the network device, that is, the terminal device does not know a position of the M1 time-frequency resources configured by the network device and does not know quantity of times that each SSB in the SSB group is sent, the terminal device will blindly detect all possible SSBs until a network is accessed.

Or, if the terminal device is in a connected state, the terminal device may learn information of the M1 time-frequency resources, the aforementioned first indication information or the second indication information, or the like, so the terminal device may detect an SSB on the M1 time-frequency resources within the first period, and assuming that a maximum quantity of times that an SSB is transmitted is 1, if the terminal device detects an SSB once, it may not continue to detect the SSB on other time-frequency resources.

For example, if the terminal device does not detect, within the first sub-period, the SSB1 on the time-frequency resources corresponding to the SSB1, the terminal device may continue to detect the SSB1 on the time-frequency resources corresponding to the SSB1 within the second sub-period, and if the SSB1 is detected, it will not continue to detect the SSB1 within other sub-periods after the second sub-period.

Or, if the terminal device is in a connected state, the terminal device may learn information of the M1 time-frequency resources, the aforementioned first indication information or the second indication information, or the like, so the terminal device may perform rate matching around an SSB according to the first indication information or the second indication information.

For example, a resource, which is scheduled to be configured for data transmission, of the terminal device includes candidate time-frequency resources of the SSB1 to the SSB5 within the second sub-period. The terminal device may determine, according to the second indication information, that two candidate time-frequency resources of the SSB1 and the SSB2 are respectively configured for sending the SSB1 and the SSB2, and three candidate time-frequency resources of the SSB3 to the SSB5 are not configured for sending an SSB, so the terminal device may assume that the three candidate time-frequency resources of the SSB3 to the SSB5 are configured for data transmission.

Therefore, according to the method for transmitting the signal of the implementation of the present disclosure, the network device may configure multiple candidate time-frequency resources for each SSB in a group of SSBs within one period, which can increase a sending opportunity of an SSB. In actual transmission, if the network device successfully transmits a corresponding SSB on one candidate time-frequency resource within the period, it may not continue to transmit the SSB on other candidate time-frequency resources, so it is beneficial to reducing resource overhead of sending the SSB while the sending opportunity of the SSB is increased.

In addition, if the terminal device in the connected state detects an SSB on one candidate time-frequency resource within the period, it may stop blind detection of the SSB on other candidate time-frequency resources within the period, which is beneficial to reducing complexity of blind detection of the terminal device.

The method for transmitting the signal according to implementations of the present disclosure is described in detail from a perspective of the network device above in combination with FIGS. 1 to 2, and a method for transmitting a signal according to another implementation of the present disclosure is described in detail from a perspective of a terminal device below in combination with FIG. 3. It should be understood that the description on the network device side corresponds to the description on the terminal device side, and the contents in the above may be referred to for similar descriptions, which will not be repeated here to avoid repetition.

FIG. 3 is a schematic flowchart of a method 300 for transmitting a signal according to another implementation of the present disclosure. As shown in FIG. 3, the method 300 includes a following content.

In S310, a terminal device detects a first Synchronization signal/PBCH block (SSB, or SS/PBCH block) on M1 time-frequency resources on a first carrier to determine a first time-frequency resource that a network device sends the first SSB, wherein the M1 time-frequency resources are time-frequency resources, which are available for transmitting the first SSB, configured by the network device for a first period on the first carrier, M1 is a positive integer, and M1≥2; and in S320, the terminal device receives, through the first time-frequency resource, the first SSB sent by the network device.

Optionally, in some implementations, a maximum quantity of times that the network device sends the first SSB within the first period is N1, wherein N1 is a positive integer, and 1≤N1<M1.

Optionally, in some implementations, quantity of times that the terminal device detects the first SSB before the first time-frequency resource within the first period is less than the N1.

Optionally, in some implementations, the method 300 further includes: the terminal device does not detect the first SSB on a time-frequency resource later than a second time-frequency resource in the M1 time-frequency resources, wherein the second time-frequency resource is a time-frequency resource, that the terminal device detects the first SSB for a N1-th time, in the M1 time-frequency resources.

Optionally, in some implementations, the first time-frequency resource is one of K1 time-frequency resources, wherein the K1 time-frequency resources are time-frequency resources, that the terminal device detects the first SSB, in the M1 time-frequency resources, the K1 is a positive integer, and 1≤K1≤N1.

Optionally, in some implementations, the K1 time-frequency resources are first K1 time-frequency resources, that the terminal device detects the first SSB, in the M1 time-frequency resources.

It should be understood that the K1 time-frequency resources on the network device side are time-frequency resources used by the network device for performing K1 transmissions of the first SSB, and the K1 time-frequency resources on the terminal device side are K1 time-frequency resources with an SSB obtained through blind detection. A case may occur that the K1 time-frequency resources of the network device and the K1 time-frequency resources on the terminal device side are inconsistent, for example, a case may occur that the network device has sent the first SSB but the terminal device have not detected it, and in this case, K1 on the network device side may be larger than K1 on the terminal device side.

Optionally, in some implementations, the first period includes M sub-periods, wherein one of the M1 time-frequency resources is included within each sub-period of the M1 sub-periods, and the M1 sub-periods correspond to the M1 time-frequency resources one by one.

Optionally, in some implementations, a position of a third time-frequency resource within the first sub-period and a position of a fourth time-frequency resource within the second sub-period are same, wherein the third time-frequency resource and the fourth time-frequency resource are two different time-frequency resources in the M time-frequency resources, the third time-frequency resource corresponds to the first sub-period, and the fourth time-frequency resource corresponds to the second sub-period.

Optionally, in some implementations, the terminal device receives first indication information sent by the network device, wherein the first indication information is configured for indicating information that the network device sends the first SSB within the first period.

Optionally, in some implementations, the terminal device receives the first indication information on a fifth time-frequency resource within the first period, wherein the first indication information is configured for indicating at least one of the following: information of a maximum quantity of times that the first SSB is sent within the first period, information of quantity of times that the first SSB has been sent on a time-frequency resource earlier than the fifth time-frequency resource within the first period, information of quantity of times that the first SSB is to be sent on a time-frequency resource later than the fifth time-frequency resource within the first period, information of a candidate position of the first SSB on a time-frequency resource later than the fifth time-frequency resource within the first period, an index of the first SSB, and a beam index of the first SSB.

Optionally, in some implementations, the first period is determined according to at least one of the following: quantity of terminal devices served by the network device, a size of a coverage area of a cell served by the network device, and a time delay requirement for the terminal device to access the network device.

Optionally, in some implementations, the first SSB is one SSB in an SSB group, the SSB group further includes a second SSB, and the method further includes: the terminal device detects the second SSB in M2 time-frequency resources on the first carrier to determine a sixth time-frequency resource where the network device sends the second SSB, wherein the M2 time-frequency resources are time-frequency resources, which are configured for transmitting the second SSB, configured by the network device for the first period on the first carrier, M2 is a positive integer, and M2≥2; and the terminal device receives, through the sixth time-frequency resource, the second SSB sent by the network device.

Optionally, in some implementations, the sixth time-frequency resource is one of K2 time-frequency resources, wherein the K2 time-frequency resources are time-frequency resources for sending the second SSB in the M2 time-frequency resources, the K2 is a positive integer, and 1≤K2≤N2, wherein the N2 is a maximum quantity of times that the network device sends the second SSB within the first period, the N2 is a positive integer, and 1≤N2<M2.

Optionally, in some implementations, the K2 time-frequency resources are first K2 time-frequency resources, availability of a channel of which are obtained by the network device, in the M2 time-frequency resources.

Optionally, in some implementations, the terminal device receives second indication information sent by the network device, wherein the second indication information is configured for indicating information that the network device sends the SSB group within the first period.

Optionally, in some implementations, the terminal device receives the second indication information on a seventh time-frequency resource within the first period, wherein the second indication information is configured for indicating at least one of the following: information of a maximum quantity of times that at least one SSB in the SSB group is sent within the first period, information of quantity of times that at least one SSB in the SSB group has been sent on a time-frequency resource earlier than the seventh time-frequency resource within the first period, information of quantity of times that at least one SSB in the SSB group is to be sent on a time-frequency resource later than the seventh time-frequency resource within the first period, information of a candidate position of at least one SSB in the SSB group on a time-frequency resource later than the seventh time-frequency resource within the first period, an index of at least one SSB in the SSB group, and a beam index of at least one SSB in the SSB group.

Method implementations of the present disclosure are described in detail above with reference to FIGS. 1 to 3, apparatus implementations of the present disclosure are described in detail below with reference to FIGS. 4 to 7. It should be understood that the apparatus implementations and the method implementations correspond to each other, and description of the method implementations may be referred to for similar description of the apparatus implementations.

FIG. 4 shows a schematic block diagram of a network device 400 according to an implementation of the present disclosure. As shown in FIG. 4, the network device 400 includes: a processing module 410, configured to perform detection on a first carrier, and determine, from M1 time-frequency resources according to a detection result, a first time-frequency resource which a availability of a channel is obtained, wherein the M time-frequency resources are time-frequency resources, which are available for transmitting a first Synchronization signal/PBCH block (SSB, or SS/PBCH block), configured by the network device for a first period on the first carrier, M1 is a positive integer, and M1≥2; and a communicating module 420, configured to send the first SSB to a terminal device through the first time-frequency resource.

Optionally, in some implementations, a maximum quantity of times that the network device sends the first SSB within the first period is N1, wherein N1 is a positive integer, and 1≤N1<M1.

Optionally, in some implementations, quantity of times that the network device sends the first SSB before the first time-frequency resource within the first period is less than the N1.

Optionally, in some implementations, the communicating module is further configured to: not send the first SSB on a time-frequency resource later than a second time-frequency resource in the M1 time-frequency resources, wherein the second time-frequency resource is a time-frequency resource, that the network device sends the first SSB for a N1-th time, in the M1 time-frequency resources.

Optionally, in some implementations, the first time-frequency resource is one of K1 time-frequency resources, wherein the K1 time-frequency resources are time-frequency resources for sending the first SSB in the M1 time-frequency resources, the K1 is a positive integer, and 1≤K1≤N1.

Optionally, in some implementations, the K1 time-frequency resources are first K1 time-frequency resources, of which availability of a channel is obtained by the network device, in the M1 time-frequency resources.

Optionally, in some implementations, the first period includes M sub-periods, wherein one of the M1 time-frequency resources is included within each sub-period of the M1 sub-periods, and the M1 sub-periods correspond to the M1 time-frequency resources one by one.

Optionally, in some implementations, a position of a third time-frequency resource within the first sub-period and a position of a fourth time-frequency resource within the second sub-period are same, wherein the third time-frequency resource and the fourth time-frequency resource are two different time-frequency resources in the M time-frequency resources, the third time-frequency resource corresponds to the first sub-period, and the fourth time-frequency resource corresponds to the second sub-period.

Optionally, in some implementations, the network device sends first indication information to the terminal device, wherein the first indication information is configured for indicating information that the network device sends the first SSB within the first period.

Optionally, in some implementations, the network device sends the first indication information on a fifth time-frequency resource within the first period, wherein the first indication information is configured for indicating at least one of the following: information of a maximum quantity of times that the first SSB is sent within the first period, information of quantity of times that the first SSB has been sent on a time-frequency resource earlier than the fifth time-frequency resource within the first period, information of quantity of times that the first SSB is to be sent on a time-frequency resource later than the fifth time-frequency resource within the first period, information of a candidate position of the first SSB on a time-frequency resource later than the fifth time-frequency resource within the first period, an index of the first SSB, and a beam index of the first SSB.

Optionally, in some implementations, the first period is determined according to at least one of the following: quantity of terminal devices served by the network device, a size of a coverage area of a cell served by the network device, and a time delay requirement for the terminal device to access the network device.

Optionally, in some implementations, the first SSB is one SSB in an SSB group, the SSB group further includes a second SSB, and the processing module is further configured to: determine a sixth time-frequency resource, of which a availability of a channel is obtained, from M2 time-frequency resources, wherein the M2 time-frequency resources are time-frequency resources, which are configured for transmitting the second SSB, configured by the network device for the first period on the first carrier, the M2 is a positive integer, and M2≥2; and the communicating module is further configured to: send the second SSB to the terminal device through the sixth time-frequency resource.

Optionally, in some implementations, the sixth time-frequency resource is one of K2 time-frequency resources, wherein the K2 time-frequency resources are time-frequency resources for sending the second SSB in the M2 time-frequency resources, the K2 is a positive integer, and 1≤K2≤N2, wherein the N2 is a maximum quantity of times that the network device sends the second SSB within the first period, the N2 is a positive integer, and 1≤N2<M2.

Optionally, in some implementations, the K2 time-frequency resources are first K2 time-frequency resources, availability of a channel of which are obtained by the network device, in the M2 time-frequency resources.

Optionally, in some implementations, the network device sends second indication information to the terminal device, wherein the second indication information is configured for indicating information that the network device sends the SSB group within the first period.

Optionally, in some implementations, the network device sends the second indication information on a seventh time-frequency resource within the first period, wherein the second indication information is configured for indicating at least one of the following: information of a maximum quantity of times that at least one SSB in the SSB group is sent within the first period, information of quantity of times that at least one SSB in the SSB group has been sent on a time-frequency resource earlier than the seventh time-frequency resource within the first period, information of quantity of times that at least one SSB in the SSB group is to be sent on a time-frequency resource later than the seventh time-frequency resource within the first period, information of a candidate position of at least one SSB in the SSB group on a time-frequency resource later than the seventh time-frequency resource within the first period, an index of at least one SSB in the SSB group, and a beam index of at least one SSB in the SSB group.

It should be understood that the network device 400 according to the implementation of the present disclosure may correspond to the network device in the method implementation of the present disclosure, and the above and other operations and/or functions of various units in the network device 400 are respectively for achieving the corresponding flows of the network device in the method 100 shown in FIG. 1, which will not be repeated here for sake of brevity.

FIG. 5 is a schematic block diagram of a terminal device according to an implementation of the present disclosure. A terminal device 500 of FIG. 5 includes: a processing module 510, configured to detect a first Synchronization signal/ PBCH block (SSB, or SS/PBCH block) on M1 time-frequency resources on a first carrier to determine a first time-frequency resource where a network device sends the first SSB, wherein the M1 time-frequency resources are time-frequency resources, which are available for transmitting the first SSB, configured by the network device for a first period on the first carrier, M1 is a positive integer, and M1≥2; and a communicating module 520, configured to receive, through the first time-frequency resource, the first SSB sent by the network device.

Optionally, in some implementations, a maximum quantity of times that the network device sends the first SSB within the first period is N1, wherein N1 is a positive integer, and 1≤N1<M1.

Optionally, in some implementations, quantity of times that the terminal device detects the first SSB before the first time-frequency resource within the first period is less than the N1.

Optionally, in some implementations, the communicating module 520 is further configured to: not detect the first SSB on a time-frequency resource later than a second time-frequency resource in the M1 time-frequency resources, wherein the second time-frequency resource is a time-frequency resource, that the terminal device detects the first SSB for a N1-th time, in the M1 time-frequency resources.

Optionally, in some implementations, the first time-frequency resource is one of K1 time-frequency resources, wherein the K1 time-frequency resources are time-frequency resources, that the terminal device detects the first SSB, in the M1 time-frequency resources, the K1 is a positive integer, and 1≤K1≤N1.

Optionally, in some implementations, the K1 time-frequency resources are first K1 time-frequency resources, that the terminal device detects the first SSB, in the M1 time-frequency resources.

Optionally, in some implementations, the first period includes M1 sub-periods, wherein one of the M1 time-frequency resources is included within each sub-period of the M1 sub-periods, and the M1 sub-periods correspond to the M1 time-frequency resources one by one.

Optionally, in some implementations, a position of a third time-frequency resource within the first sub-period and a position of a fourth time-frequency resource within the second sub-period are same, wherein the third time-frequency resource and the fourth time-frequency resource are two different time-frequency resources in the M1 time-frequency resources, the third time-frequency resource corresponds to the first sub-period, and the fourth time-frequency resource corresponds to the second sub-period.

Optionally, in some implementations, the terminal device receives first indication information sent by the network device, wherein the first indication information is configured for indicating information that the network device sends the first SSB within the first period.

Optionally, in some implementations, the terminal device receives the first indication information on a fifth time-frequency resource within the first period, wherein the first indication information is configured for indicating at least one of the following: information of a maximum quantity of times that the first SSB is sent within the first period, information of quantity of times that the first SSB has been sent on a time-frequency resource earlier than the fifth time-frequency resource within the first period, information of quantity of times that the first SSB is to be sent on a time-frequency resource later than the fifth time-frequency resource within the first period, information of a candidate position of the first SSB on a time-frequency resource later than the fifth time-frequency resource within the first period, an index of the first SSB, and a beam index of the first SSB.

Optionally, in some implementations, the first period is determined according to at least one of the following: quantity of terminal devices served by the network device, a size of a coverage area of a cell served by the network device, and a time delay requirement for the terminal device to access the network device.

Optionally, in some implementations, the first SSB is one SSB in an SSB group, the SSB group further includes a second SSB, and the processing module is further configured to: detect the second SSB in M2 time-frequency resources on the first carrier to determine a sixth time-frequency resource where the network device sends the second SSB, wherein the M2 time-frequency resources are time-frequency resources, which are configured for transmitting the second SSB, configured by the network device for the first period on the first carrier, M2 is a positive integer, and M2≥2; and the communicating module is further configured to: receive, through the sixth time-frequency resource, the second SSB sent by the network device.

Optionally, in some implementations, the sixth time-frequency resource is one of K2 time-frequency resources, wherein the K2 time-frequency resources are time-frequency resources for sending the second SSB in the M2 time-frequency resources, the K2 is a positive integer, and 1≤K2<N2, wherein the N2 is a maximum quantity of times that the network device sends the second SSB within the first period, the N2 is a positive integer, and 1≤N2<M2.

Optionally, in some implementations, the K2 time-frequency resources are first K2 time-frequency resources, availability of a channel of which are obtained by the network device, in the M2 time-frequency resources.

Optionally, in some implementations, the terminal device receives second indication information sent by the network device, wherein the second indication information is configured for indicating information that the network device sends the SSB group within the first period.

Optionally, in some implementations, the terminal device receives the second indication information on a seventh time-frequency resource within the first period, wherein the second indication information is configured for indicating at least one of the following: information of a maximum quantity of times that at least one SSB in the SSB group is sent within the first period, information of quantity of times that at least one SSB in the SSB group has been sent on a time-frequency resource earlier than the seventh time-frequency resource within the first period, information of quantity of times that at least one SSB in the SSB group is to be sent on a time-frequency resource later than the seventh time-frequency resource within the first period, information of a candidate position of at least one SSB in the SSB group on a time-frequency resource later than the seventh time-frequency resource within the first period, an index of at least one SSB in the SSB group, and a beam index of at least one SSB in the SSB group.

Specifically, the terminal device 500 may correspond to (e.g., may be configured in or be itself) the terminal device described in the method 300, and various modules or units in the terminal device 500 are respectively configured for executing various actions or processes performed by the network device in the method 300. Herein, in order to avoid redundancy, detailed description thereof is omitted.

Figure 6:
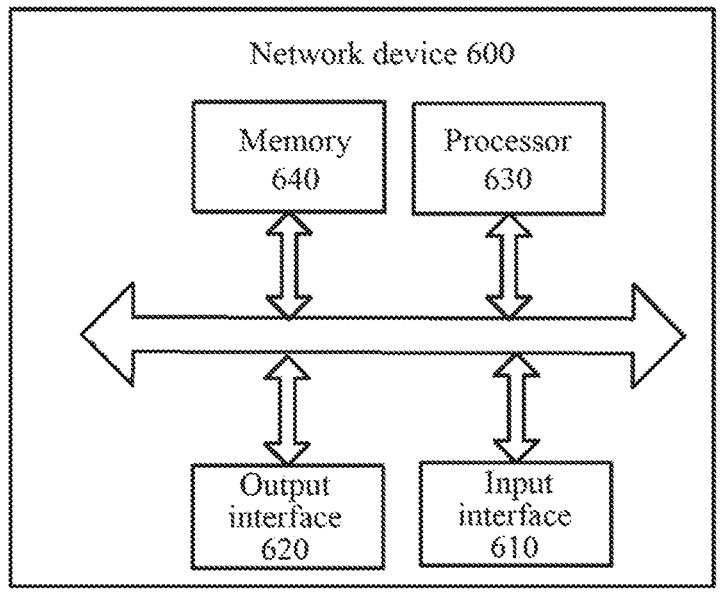
FIG. 6 shows a schematic block diagram of a network device according to another implementation of the present disclosure.

As shown in FIG. 6, an implementation of the present disclosure further provides a network device 600, wherein the network device 600 may be the network device 400 in FIG. 4, which can be configured for performing the content of the network device corresponding to the method 100 in FIG. 1. The device 600 includes an input interface 610, an output interface 620, a processor 630, and a memory 640. The input interface 610, the output interface 620, the processor 630, and the memory 640 may be connected through a bus system. The memory 640 is configured for storing programs, instructions, or codes. The processor 630 is configured for executing programs, instructions, or codes in the memory 640 to control the input interface 610 to receive signals, to control the output interface 620 to send signals, and to complete the operations in the foregoing method implementations.

It should be understood that in the implementations of the present disclosure, the processor 630 may be a Central Processing Unit (CPU), or the processor 630 may be other general processor, digital signal processor (DSP), application specific integrated circuits (ASIC), field programmable gate arrays (FPGA) or other programmable logic device, discrete gate or transistor logic device, discrete hardware components, etc. The general processor may be a microprocessor, or the processor may be any conventional processor or the like.

The memory 640 may include the read only memory and random access memory, and provide instructions and data to the processor 630. A portion of memory 640 may include non-volatile random access memory. For example, the memory 640 may also store information of device type.

In implementation processes, various contents of the methods described above may be accomplished by integrated logic circuits of hardware or instructions in the form of software in the processor 630. The contents of the method disclosed in connection with the implementations of the present disclosure may be directly embodied to be accomplished by an execution of the hardware processor or by the combination of hardware and software modules in the processor. The software modules may be located in a storage medium commonly used in the art, such as a random access memory, flash memory, read-only memory, programmable read-only memory or electrically erasable programmable memory, or register. The storage medium is located in the memory 640, and the processor 630 reads information in the memory 640 and completes the contents of the above method in combination with its hardware. In order to avoid repetition, it will not be described in detail here.

In a specific implementation, the processing module 410 included in the network device 400 in FIG. 4 may be implemented with the processor 630 of FIG. 6, and the communicating module 420 included in the network device 400 in FIG. 4 may be implemented with the input interface 610 and the output interface 620 of FIG. 6.

Figure 7:
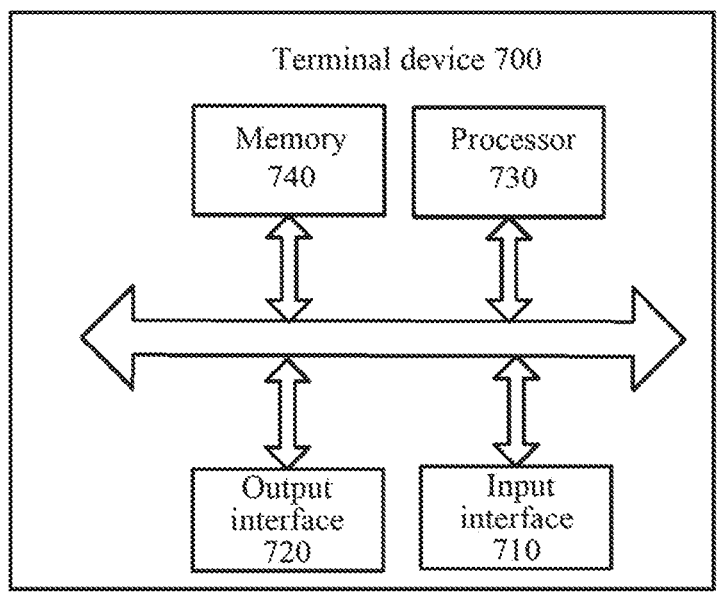
FIG. 7 shows a schematic block diagram of a terminal device according to another implementation of the present disclosure.

As shown in FIG. 7, an implementation of the present disclosure further provides a terminal device 700, wherein the terminal device 700 may be the terminal device 500 in FIG. 5, which may be configured for performing the content of the terminal device corresponding to the method 300 in FIG. 3. The device 700 includes an input interface 710, an output interface 720, a processor 730, and a memory 740. The input interface 710, the output interface 720, the processor 730, and the memory 740 may be connected through a bus system. The memory 740 is configured for storing programs, instructions, or codes. The processor 730 is configured for executing programs, instructions, or codes in the memory 740 to control the input interface 710 to receive signals, to control the output interface 720 to send signals, and to complete the operations in the foregoing method implementations.

It should be understood that in the implementations of the present disclosure, the processor 730 may be a Central Processing Unit (CPU), or the processor 730 may be other general processor, digital signal processor (DSP), application specific integrated circuits (ASIC), field programmable gate arrays (FPGA) or other programmable logic device, discrete gate or transistor logic device, discrete hardware components, etc. The general processor may be a microprocessor, or the processor may be any conventional processor or the like.

The memory 740 may include the read only memory and random access memory, and provide instructions and data to the processor 730. A portion of memory 740 may include non-volatile random access memory. For example, the memory 740 may also store information of device type.

In implementation processes, various contents of the methods described above may be accomplished by integrated logic circuits of hardware or instructions in the form of software in the processor 730. The contents of the method disclosed in connection with the implementations of the present disclosure may be directly embodied to be accomplished by an execution of the hardware processor or by the combination of hardware and software modules in the processor. The software modules may be located in a storage medium commonly used in the art, such as a random access memory, flash memory, read-only memory, programmable read-only memory or electrically erasable programmable memory, or register. The storage medium is located in the memory 740, and the processor 730 reads information in the memory 740 and completes the contents of the above method in combination with its hardware. In order to avoid repetition, it will not be described in detail here.

In a specific implementation, the processing module 510 included in the terminal device 500 in FIG. 5 may be implemented with the processor 730 in FIG. 7, and the communicating module 520 included in the terminal device 500 in FIG. 5 may be implemented with the input interface 710 and the output interface 720 of FIG. 7.

An implementation of the present disclosure provides a computer readable storage medium, the computer readable storage medium stores one or more programs including instructions which, when executed by a portable electronic device including multiple application programs, enable the portable electronic device to perform the methods of the implementations shown in FIGS. 1 to 3.

The implementation of the present disclosure provides a computer program, which includes instructions which, when executed by a computer, enable the computer to execute the corresponding flows of the methods of the implementations shown in FIGS. 1 to 3.

Those of ordinary skill in the art will recognize that the exemplary elements and algorithm acts described in connection with the implementations disclosed herein may be implemented in electronic hardware, or a combination of computer software and electronic hardware. Whether these functions are performed in hardware or software depends on the specific application and design constraints of the technical solution. Skilled artisans may use different methods to implement the described functions in respect to each particular application, but such implementation should not be considered to be beyond the scope of the present disclosure.

Those skilled in the art may clearly understand that for convenience and conciseness of description, corresponding processes in the aforementioned method implementations may be referred to for the specific working processes of the system, device, and unit described above, which are not repeated here.

In several implementations provided by the present disclosure, it should be understood that the disclosed systems, apparatuses and methods may be implemented in other ways. For example, the apparatus implementations described above are only illustrative, for example, the division of the units is only a logical function division, and there may be other division manners in actual implementation. For example, multiple units or components may be combined or integrated into another system, or some features may be ignored or not executed. On the other hand, the mutual coupling or direct coupling or communication connection shown or discussed may be indirect coupling or communication connection through some interface, apparatus or unit, and may be electrical, mechanical or in other forms.

The unit described as a separate component may or may not be physically separated, and the component shown as a unit may or may not be a physical unit, i.e., it may be located in one place or may be distributed over multiple network units. Some or all of the units may be selected according to practical needs to achieve a purpose of the implementations.

In addition, various functional units in various implementations of the present disclosure may be integrated in one processing unit, or the various units may be physically present separately, or two or more units may be integrated in one unit.

The functions may be stored in a computer readable storage medium if implemented in a form of software functional units and sold or used as a separate product. Based on this understanding, the technical solution of the present disclosure, in essence, or the part contributing to the prior art, or the part of the technical solution, may be embodied in the form of a software product stored in a storage medium, including a number of instructions for causing a computer device (which may be a personal computer, a server, or a network device) to perform all or part of the acts of the method described in various implementations of the present disclosure. The aforementioned storage media include U disk, mobile hard disk, read-only memory (ROM), random access memory (RAM), magnetic disk or optical disk, and other media capable of storing program codes.

What are described above are merely exemplary implementations of the present disclosure, but the protection scope of the present disclosure is not limited thereto. Any change or substation that may be easily conceived by a person skilled in the art within the technical scope disclosed by the present disclosure shall be included within the protection scope of the present disclosure. Therefore, the protection scope of the present disclosure shall be the protection scope defined by the claims.

What is claimed is:

1. A method for signal transmission, comprising:
   obtaining, by a terminal device, a plurality of candidate time-frequency resources of a first SSB (Synchronization signal/PBCH block) within a first period, wherein the first SSB is in a SSB group on a first carrier;
   monitoring, by the terminal device, the first SSB in at least one of the plurality of candidate time-frequency resources, to determine that the terminal device receives the first SSB in a first time-frequency resource, wherein the first time-frequency resource is one of the plurality of candidate time-frequency resources;
   wherein the plurality of candidate time-frequency resources comprises M time-frequency resources, the first period comprises M sub-periods, each of the M sub-periods comprises one time-frequency resource in the M time-frequency resources, and the M sub-periods corresponds to the M time-frequency resources one by one; wherein each SSB in the SSB group is configured with a time-frequency resource for transmitting the each SSB in each sub-period.

2. The method according to claim 1, wherein the terminal device assumes that a maximum quantity of transmission times of each SSB in the SSB group is 1 within the first period.

3. The method according to claim 1, further comprising:
   monitoring, by the terminal device, the first SSB not in a time-frequency resource later than the first time-frequency resource within the plurality of candidate time-frequency resources, wherein the first time-frequency resource is a time-frequency resource, where the terminal device detects the first SSB for a first time, within the plurality of candidate time-frequency resources.

4. The method according to claim 1, wherein all of the M time-frequency resources share a same position in sub-periods of the M sub-periods.

5. The method according to claim 1, wherein the terminal device receives an indication information sent from a network device, the indication information being configured for indicating information about transmission of at least one SSB in the SSB group by the network device within the first period.

6. The method according to claim 5, wherein the indication information is configured for indicating a beam identifier of the at least one SSB in the SSB group.

7. The method according to claim 6, wherein spatial reception parameters of two SSBs with a same beam identifier are quasi co-located.

8. The method according to claim 5, further comprising:
   performing, by the terminal device, rate-matching on at least one SSB in the SSB group based on the indication information for data reception.

9. A method for signal transmission, comprising:
   sensing, by a network device, on a channel of a first carrier, to obtain the availability of a first time-frequency resource based on a sensing result, wherein the first time-frequency resource is one time-frequency resource in a plurality of candidate time-frequency resources of a first SSB, Synchronization signal/PBCH block, within a first period, wherein the first SSB is in a SSB group on the first carrier; and sending, by the network device to a terminal device, the first SSB through the first time-frequency resource;

wherein the plurality of candidate time-frequency resources comprises M time-frequency resources, the first period comprises M sub-periods, each of the M sub-periods comprises one time-frequency resource in the M time-frequency resources, and the M sub-periods corresponds to the M time-frequency resources one by one; wherein each SSB in the SSB group is configured with a time-frequency resource for transmitting the each SSB in each sub-period.

10. The method according to claim 9, wherein the network device determines that a maximum quantity of transmission times of each SSB in the SSB group is 1 within the first period.

11. The method according to claim 9 further comprising:
sending, by the network device, the first SSB not in a time-frequency resource later than the first time-frequency resource within the plurality of candidate time-frequency resources, wherein the first time-frequency resource is a time-frequency resource, where the network device sends the first SSB for a first time, within the plurality of candidate time-frequency resources.

12. The method according to claim 9, wherein all of the M time-frequency resources share a same position in sub-periods of the M sub-periods.

13. The method according to claim 9, wherein the network device sends an indication information to the terminal device, the indication information being configured for indicating information about transmission of at least one SSB in the SSB group by the network device within the first period.

14. The method according to claim 13, wherein the indication information is configured for indicating a beam identifier of the at least one SSB in the SSB group.

15. The method according to claim 14, wherein spatial reception parameters of two SSBs with a same beam identifier are quasi co-located.

16. The method according to claim 13, further comprising:
performing, by the network device, rate-matching on at least one SSB in the SSB group based on the indication information for data reception.

17. A terminal device, comprising a memory, a processor, an input interface and an output interface, wherein the memory, the processor, the input interface and the output interface are connected through a bus system, the memory is configured for storing instructions, the processor is configured for executing the instructions stored in the memory to control the input interface to receive signals and to control the output interface to send signals, when the instructions stored in the memory is executed, the processor is further configured to:

obtain a plurality of candidate time-frequency resources of a first SSB (Synchronization signal/PBCH block) within a first period, wherein the first SSB is in a SSB group on a first carrier;

monitor the first SSB in at least one of the plurality of candidate time-frequency resources, to determine that the terminal device receives the first SSB in a first time-frequency resource, wherein the first time-frequency resource is one of the plurality of candidate time-frequency resources;

wherein the plurality of candidate time-frequency resources comprises M time-frequency resources, the first period comprises M sub-periods, each of the M sub-periods comprises one time-frequency resource in the M time-frequency resources, and the M sub-periods corresponds to the M time-frequency resources one by one; wherein each SSB in the SSB group is configured with a time-frequency resource for transmitting the each SSB in each sub-period.

18. A network device, comprising a memory, a processor, an input interface and an output interface, wherein the memory, the processor, the input interface and the output interface are connected through a bus system, the memory is configured for storing instructions, the processor is configured for executing the instructions stored in the memory to control the input interface to receive signals and to control the output interface to send signals, when the instructions stored in the memory is executed, the processor is further configured to:

sense on a channel of a first carrier to obtain the availability of a first time-frequency resource based on a sensing result, wherein the first time-frequency resource is one time-frequency resource in a plurality of candidate time-frequency resources of a first SSB, Synchronization signal/PBCH block, within a first period, wherein the first SSB is in a SSB group on the first carrier; and send the first SSB through the first time-frequency resource to a terminal device;

wherein the plurality of candidate time-frequency resources comprises M time-frequency resources, the first period comprises M sub-periods, each of the M sub-periods comprises one time-frequency resource in the M time-frequency resources, and the M sub-periods corresponds to the M time-frequency resources one by one; wherein each SSB in the SSB group is configured with a time-frequency resource for transmitting the each SSB in each sub-period.

* * * * *